3,205,107
PROCESS FOR MAKING FILAMENT TOBACCO SMOKE FILTERS
Paul Gallagher, Kingsport, Tenn., assignor to Eastman Kodak Company, Rochester, N.Y., a corporation of New Jersey
Filed Dec. 2, 1959, Ser. No. 856,769
3 Claims. (Cl. 156—180)

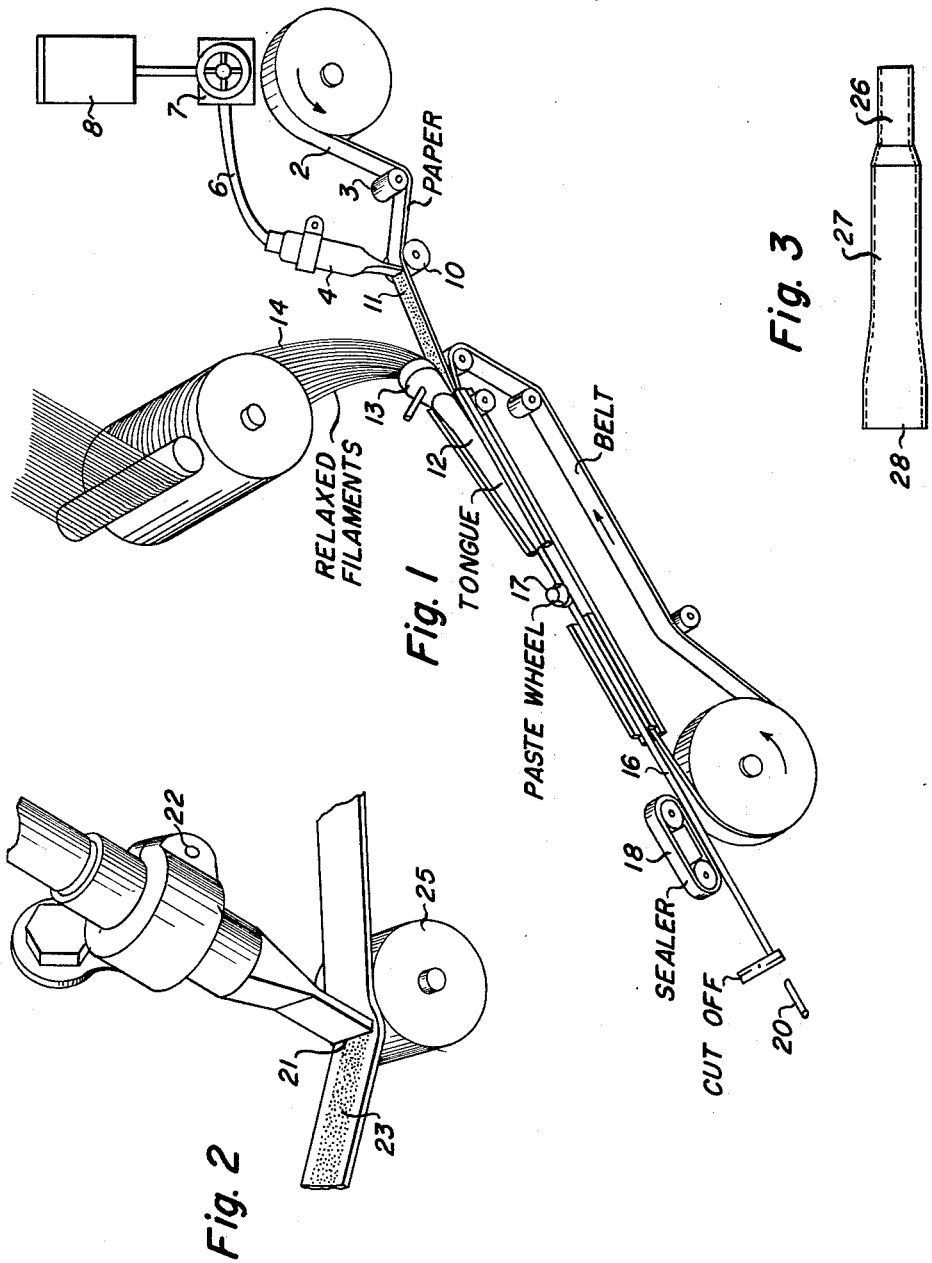

This invention relates to process and apparatus for the manufacture of filament tobacco smoke filters. More particularly this invention relates to the process and apparatus for cellulose acetate paper-wrapped filters which filters are improved in that the filaments of the filter are bonded to the wrapping material enclosing the periphery of the filter.

The manufacture of cellulose acetate tobacco smoke filters in accordance with the disclosure contained in my co-workers' U.S. Patent No. 2,794,480 has been favorably received in the industry and good filters may be produced by the disclosure of said patent. However, in some instances, such as the making of filters from filament material of low denier and/or low crimp, there may be a tendency of the filament part of the filter not to be as firmly positioned against the wrapper enclosing the filter as is desirable. This can permit the channeling or by-passing of the smoke between the filaments and the wrapper thereby reducing the efficiency of the filter. In another of my co-worker's co-pending U.S. patent applications Serial No. 824,577, now Patent 3,025,861 the aforementioned problem concerning the separation of the filaments from the wrapper is discussed in detail and my co-worker has described procedure for overcoming this difficulty. It is apparent that in the manufacture of filters of the type indicated that it is important to be able to operate at high rates of production. Accordingly, the development of certain improvements in the procedures for making filters as described in my co-workers' patent and application referred to above represents a desirable result.

After extended investigation, I have found a process and apparatus whereby improved filament filters may be produced at relatively high speeds of production to give filter elements generally in accordance with the product of said application 824,577, which filter products are characterized in that the filaments and the inside of the wrapper are not subject to separation or the like. In addition, such filters may possess other advantages, for example, such as having greater firmness.

This invention has for one object to improve the efficiency of tobacco smoke filters made from crimped continuous filaments by eliminating the possibility that smoke may pass between the periphery of the filter and the wrapper. Another object is to prevent the filter from shrinking in cross section due to the action of the hot, moist smoke. A further object is to provide a simple, inexpensive process and apparatus for obtaining adhesion between the wrapper and the periphery filaments of the filter bundle. Another object is to provide means which is readily adaptable to existing filter forming equipment and is suited to high speed operation. Still another object is to secure a uniform, square cut when subdividing filters into short lengths, said cut being essentially free of any fuzziness caused by displacement of the fibers adjacent to the inner surface of the wrap.

In the broader aspects of the present invention adhesion of the outer filaments to the wrapper is secured by coating the inner surface of the wrapper with certain coating compositions. For example, liquid dope (coating composition) is applied as solutions containing 1–4% cellulose acetate, balance triacetin. Though such solutions give good results with the equipment used, it is possible to use solutions containing up to 10% cellulose acetate. The solutions of this invention have the advantage that they do not cause shrinkage of the wrap. Hence more precise circumference control of the filter is possible. The dope was applied through a ¾" O.D. tube which terminated in a flared slot $15/16''$ x $1/32''$.

The paper passed under and was in contact with the slot. This spreader tube was connected to a dope supply tank which was approximately 2 feet above the surface of the slot in the spreader. The flow of dope, or the weight of dope deposited on the paper was controlled by the dimensions of the slot, the viscosity of the dope, the height of the supply tank and the pressure of the paper against the slot. Using the above described equipment and method, it was found that 1 gm. to 1.5 gm. of dope per 180 cm. length of paper (equivalent to 23 gm. to 34.5 gm. per square meter of coated area) could be applied evenly and gave good adhesion between the filter and the paper wrap. It is desirable to guide the paper before it comes in contact with the dope. It is also desirable to use a slot of such a width as to cover all of the paper except that portion of one edge to which the sealing glue is applied in the rod making machine.

In further detail, the over-all apparatus and procedure for making filters in accordance with the present invention may be along the lines disclosed in the aforementioned U.S. Patent 2,794,480. That is, the steps of moving from the package the filaments which are to be made into the filter, the opening and banding of these filaments, the spraying of these filaments and the like steps may be in accordance with the disclosure of FIG. 1 of said Patent 2,794,480. However, referring to FIG. 5 of said patent, in order to practice the present invention, the processing of the paper wrap and certain other items would be changed to embody the present invention.

Or, rather than proceeding with the arrangement disclosed in FIG. 5 just mentioned, the filter forming and wrapping procedure described in copending U.S. patent application Serial No. 761,602 and now Patent 3,016,945 of my co-worker Wexler may be employed.

For assistance in the better understanding of the instant invention, reference is made to the attached drawing forming a part of the present application. In the attached drawing:

FIG. 1 is a semidiagrammatic side elevation view of one apparatus arrangement which would be used for carrying out the present invention;

FIG. 2 is a detail view on an enlarged scale of a portion of the apparatus shown in FIG. 1; and FIG. 3 is a detail top view of a coating applicator which would be used to apply the coating of the instant invention.

Referring to FIG. 1, which concerns a segment of an apparatus used for the line production of filters, it will be kept in mind that the filaments 14 shown in FIG. 1 have gone through other steps of the process (not shown) so that the filaments are at the stage of the process where they are to be wrapped. In further detail, the filaments which are being made into a filter have proceeded through the first steps of the aforementioned Patent 2,794,480 such as indicated in FIGS. 1, 2 and 3 and have now arrived at the wrapping stage indicated in FIG. 5 of Patent 2,794,480.

Or, the filaments may have been processed as described in said Wexler application Serial No. 761,602 and are at the wrapping stage as shown in this application.

Therefore, referring to FIG. 1, a source of paper wrap material is provided at 2, such wrapping material being continuously supplied from a roll. This wrap material is passed under a guide roll 3 so that it may be directed in contact with the applicator 4 of the present invention after the paper wrap passes over roll 10. The wrap used in the present invention may be conventional filter wrap paper of a thickness of approximately 0.03 mm. However, in many instances where the filaments being processed are of a denier of 3 or below, I prefer to use a wrap of a greater thickness such as 0.06 mm.

The applicator 4 is positioned (as better shown in FIG. 2) to apply certain coatings in accordance with the present invention against the inside of the paper wrap after the wrap passes over roll 10. The applicator 4 is connected by flexible conduits 6 through a valve means which is connected to supply tank 8. The control of the height (head) of this supply tank above the applicator and the level therein are of some importance in obtaining the most uniform coating out of applicator 4.

Therefore, by the combination of applicator 4 with the paper passing over roll 10 there may be applied to the inside of the paper a relatively thin layer of the coating composition of the present invention. This may be accomplished at relatively high speed since the coating composition of the present invention is not adhesive or particularly tacky at the point of application thereof. As will be noted from the description hereinafter, the coating composition of the present invention does produce bonding between the filaments and the paper wrap.

This coated wrap 11 is then fed into the filter forming garniture 12. This garniture 12 is provided with suitable means 13 through which the filaments may be injected into the garniture for forming into the desired filter shape.

The formed filter 16 leaving garniture 12 is wrapped in the wrapper. Pasting and sealing means designated generally at 17 and 18 may be provided for sealing the filter. Also, means may be provided for heating the sealed filter element, cutting the filter elements into certain lengths and the like. Since these various parts may be in accordance with the disclosure in the aforesaid Patent 2,794,480 or as disclosed in said companion application 761,602, extended description thereof appears to be unnecessary. It is sufficient to indicate that the formed and wrapped filter is ejected at 20 and may be stored, packaged or otherwise handled in the conventional and desired manner.

Referring now to FIG. 2, which figure shows on a larger scale the feature of applying the coatings of the present invention, the tip of the applicator is indicated at 21, which tip slightly depresses the paper after it passes in contact with roll 25. The paper is coated on the inside as indicated at 23. The applicator is positioned in a manner so that it may be rotated as at 22 for better applying the coating and controlling the thickness of the coating as will be apparent from the description hereinafter.

Referring to FIG. 3, the simple internal construction of the applicator is disclosed. It will be noted that the upper end of the applicator 26 is of a size and shape to permit the fastening thereof to the flexible conduit 6 of FIG. 1. The applicator increases in size as at 27. At the outlet end 28, the applicator while increasing in width, tapers to a slot orifice. The width of this slot is slightly less than the width of the paper inasmuch as the entire width of the paper is not coated, there being left a slight uncoated margin for sealing purposes as will be pointed out hereinafter.

The coating composition used in the present invention and its method of preparation constitute important elements of the present invention. The coating composition, as indicated above, is not an adhesive as applied from the applicator; hence, it is not such as to gum the applicator or cause such difficulties as would be the situation with typical adhesives. On the other hand, when the coating contacts the filaments during the wrapping operation, it quite readily bonds the filaments to the wrapper.

A satisfactory method of making the coating composition is as follows:

(1) Add the cellulose acetate to the cold (room temperature) triacetin while the triacetin is being agitated vigorously.

(2) Raise the temperature of the solution to approximately 60° C. with continuous agitation and hold this temperature until solvation is complete. This should be accomplished within one hour.

(3) The solution may be mixed at the concentration desired or a more concentrated solution may be prepared and then diluted to the desired concentration with cold triacetin.

A further understanding of my invention will be had from the following example which is set forth in order to illustrate my preferred embodiment.

In this example, an apparatus generally in accordance with the disclosures of the attached drawing was used. The coating composition (dope) was comprised of 4% cellulose acetate incorporated with 96% glycerol triacetate. The coating composition was made up according to the procedure described above wherein the cellulose acetate is added to the organic compound with stirring and followed by heating. However, the coating composition, before filling container 8, was cooled to room temperature and the coating process of the present invention was carried out at room temperature.

The paper to be coated on the inside surface was fed through the process and apparatus of the present invention at a rate so as to produce approximately 1,000 90 mm. filter rods per minute. The tank containing the coating dope was positioned approximately 3 feet above the paper, the amount of dope flowing through the applicator nozzle onto the paper was controlled by the amount of pressure between the nozzle and the paper. This can be done as may be seen from FIG. 2 by causing the paper to "break" or angle over the end of the nozzle after it goes over roll 25. If desired, the applicator nozzle 21 may be positioned in a manner so that the vertical movement thereof against the paper can be controlled by a screw adjustment or comparable means.

A relatively uniform level of coating composition was maintained in the supply tank to insure a constant feed onto the paper and thus to provide a relatively uniform coating. In general, this coating may be approximately as thin as the apparatus will deposit continuously at the speed of the paper moving under the nozzle. A coating of a thickness of the order of 0.0008 inch up to 0.0012 inch is satisfactory. As will be further noted from FIG. 2, the coating is not applied to the edge of the paper since it is preferred to leave a margin for receiving the regular sealing adhesive or glue when the paper has been positioned around the filter and the seam sealed. In this particular example the width of the nozzle used was approximately 4 mm. narrower than the 28 mm. width paper treated. The coating went onto the paper very smoothly and there was no accumulation or clogging of the applicator nozzle or the forming garniture when the paper proceeded to garniture 12 of FIG. 1.

Several different rods were made by the present invention using relatively fine denier filaments on the one hand to coarser filaments for other rods. These filter rods were compared with comparable filter rods made without the coating procedure of the present invention. The results of these comparisons are set forth in Table I which follows:

*Table I*

| Filaments | With Coating | | | | Without Coating | | | |
|---|---|---|---|---|---|---|---|---|
| | Rod Pressure | Tip Pressure | Percent Removal | Percent Removal Per in. Tip Pressure | Rod Pressure | Tip Pressure | Percent Removal | Percent Removal Per in. Tip Pressure |
| 1.6/32,000–1.6/37,000 | 13.2 | 2.32 | 46.8 | 20.2 | 12.2–12.9 | 2.34 | 41.3 | 17.6 |
| 3.0/78,000 | 12.2 | 2.18 | 23.6 | 10.8 | 11.9 | 2.07 | 18.8 | 9.1 |
| 4.0/74,000 | 10.8 | 1.92 | 32.5 | 16.9 | 10.5 | 1.93 | 31.0 | 16.0 |

It will be observed from a consideration of the data appearing in the above table that, for example, a filter made from fine denier filaments in accordance with the present invention exhibits a removal of the order of 46.8 as compared with a comparable filter produced by other procedure having only a removal of 41.3.

Although in the above table the use of filament size up to 4 denier per filament has been set forth, the coated wrapper of the present invention will function on all filament sizes up to and including, for example, 16 denier per filament. However, in general it appears that the present invention provides more advantage when used in conjunction with the finer denier filaments of the order of 3 denier per filament or lower. In connection with filters made with these finer filaments, there may be some greater tendency of shrinkage to occur and the present invention overcomes any reduction of efficiency that could be caused by such shrinkage causing the filaments to pull away from the wrapper.

Another advantage of my coating results from the improved appearance of the cut end when rods are subdivided into short lengths. In general, filters formed by the apparatus and method disclosed in U.S. Patent No. 2,794,480 can be cut without difficulty because the filaments are bonded to one another at intervals by the action of the plasticizer. However, certain filter tips for cigarettes are composed of two or more separate and different elements thereby securing results which cannot be obtained with a single element. In such cases the elements are quite short, for example, 7.5 mm. These short elements are more difficult to cut cleanly as some peripheral filaments may not be affixed to adjacent ones by a sufficient number of bonds. Also the wrapper and the body do not constitute a single, rigid structure. My invention overcomes this difficulty as the body and wrapper are a unitary structure. There is much less possibility that filaments will be displaced by the force exerted by the cutting blade. Thus, a clean, square cut results without any fuzziness attributable to filaments which project beyond the main surface.

The cellulose acetate used above had an acetyl content within the range of 38.5–40% and an intrinsic viscosity of about 1. Approximately 1–1.5 grams of solution will satisfactorily coat 180 cm. length of the wrap. However, I have further found that 2 parts of cellulose acetate of the same acetyl content but of an intrinsic viscosity of 1.5–2 dissolved in 98 parts of triacetin will give a good bond from about .5–1.0 gram of solution per 180 cm. of wrap. Therefore, as indicated with respect to the preferred coating solution, the composition thereof may be varied somewhat.

Although I prefer the procedure and apparatus described above, since the applicator shown constitutes a relatively simple and inexpensive way of adapting existing filter manufacturing equipment to the present invention, in the broader aspects the present invention is not restricted exactly to the construction shown. It would be possible to replace or supplement my applicator construction with a wick or brush or to use a roll applicator. Or, in certain instances special spray gun equipment could be substituted for my simple nozzle applicator. However, certain of these additional constructions would involve increased expense and would not produce a better product. In the event added refinements are to be made in the present apparatus, I would prefer to provide screw adjustment devices whereby my nozzle applicator might be better aligned and positioned vertically with respect to the rapidly moving paper.

For the manufacture of cellulose acetate filters, I prefer to use the coating composition as described above since it is relatively tasteless, nontoxic and relatively rigidly and firmly bonds the surface filaments of the filter to the inside of the wrapper. This gives a nonchanneling filter which has good firmness and other properties when made with fine denier filaments.

In general, for filters composed of cellulose acetate filaments, the liquid component of my composition may be any one of a number of plasticizers for cellulose acetate having the following properties.

(1) Relatively low volatility
(2) Nontoxic
(3) Relatively low odor and taste
(4) Having some solvating action at 25° C.

In addition to triacetin (glycerol triacetate) described above as preferred, the following also meet the above requirements glycerol triproprionate, di(methoxyethyl) phthalate, triethyl citrate and methyl phthalyl ethyl glycolate may be used.

The solid component must also be soluble in the plasticizer. In addition to the preferred cellulose acetate, other suitable solid components include, cellulose proprionate, polyvinyl acetate and certain natural gums.

My invention can also be practiced when filters are made from other fibers provided said fibers are susceptible to plasticization or partial solvation. In such cases appropriate liquids and polymers would be selected in view of the teaching herein to operate with the particular fiber.

In its broader aspects my invention pertains to a coating composition wherein the liquid component is relatively nonvolatile and the bonding action occurs not by drying or evaporation but by absorption of the liquid component into the fibers. Thus my composition is stable in open storage and does not accumulate on the rod forming apparatus.

The invention has been described in detail with particular reference to preferred embodiments thereof, but it will be understood that variations and modifications can be effected within the spirit and scope of the invention as described hereinabove and as defined in the appended claims.

I claim:

1. A process for the preparation of tobacco smoke filter elements made from crimped continuous filaments wrapped in a web wrapper which comprises applying along the inner surface of the web wrapper while leaving a margin for receiving a sealing adhesive a liquid dope coating composition comprising a solid component added to a plasticizer liquid component to form a solution, said plasticizer liquid component being characterized by having relatively low volatility, being non-toxic, having a relatively low odor and taste and having some solvating action at 25° C. and said solid component selected from the group consisting of cellulose ester, polyvinyl acetate and natural gums, wrapping said wrapper around the mass of said crimped continuous filaments, bonding the web wrapper to the surface of said mass of crimped continuous filaments by absorption of said plasticizer liquid component into said mass of crimped continuous filaments, applying sealing adhesive to said wrapper margin, sealing the seam, and cutting said mass into appropriate lengths, thereby forming tobacco smoke filter elements whereby the smoke passage between the periphery of mass of crimped filaments and wrapper is minimized.

2. A process in accordance with claim 1 wherein the filaments are crimped continuous cellulose acetate filaments of a denier of from 0.5 to 16, the liquid-dope coating composition consists of about 1–4% by weight cellulose ester as the solid componen dissolved in about 96–99% by weight triacetin as the liquid component and the wrapper is comprised of paper of a thickness of the order of 0.03 to 0.06 mm.

3. In a process of making tobacco smoke filter elements comprised of crimped continuous cellulose acetate filaments of a denier of from 0.5 to 16 which are wrapped in a paper wrapper, the improvement which comprises applying partially across the inner surface of the paper wrapper as a solution a liquid-dope coating composition without adhesive ability when applied, said liquid-dope coating composition consisting of 1–4% by weight solid cellulose ester dissolved in 96–99% by weight liquid triacetin, the paper wrapper being of a thickness of the order of 0.03 to 0.06 mm., and then contacting the surface filamnets of the element with said liquid-dope coating composition applied to said paper wrapper during the wrapping operation and bonding the surface filaments to the paper wrapper with absorption of liquid triacetin by the filaments.

References Cited by the Examiner
UNITED STATES PATENTS

| | | | |
|---|---|---|---|
| 286,402 | 10/83 | Duke | 117—44 |
| 856,030 | 6/07 | Cavargna | 131—10 |
| 1,444,082 | 2/23 | Poeppel | 117—44 |
| 1,607,090 | 11/26 | Leonard | 117—157 XR |
| 1,957,611 | 5/34 | Pelton | 117—157 XR |
| 2,159,108 | 5/39 | Staudt | 156—336 |
| 2,341,464 | 2/44 | Meyer | 106—180 |
| 2,380,269 | 7/45 | Stuhlfauth | 154—1 |
| 2,430,424 | 11/47 | Hochwalt et al. | 106—180 |
| 2,608,543 | 8/52 | Wiswell. | |
| 2,685,344 | 8/54 | Bunzl | 131—10 XR |
| 2,688,356 | 9/54 | Conti | 154—1 |
| 2,794,239 | 6/57 | Crawford et al. | |
| 2,794,480 | 6/57 | Crawford et al. | 156—510 |
| 2,881,769 | 4/59 | Touey | 131—208 |
| 2,905,184 | 9/59 | Schur | 131—208 |
| 2,916,038 | 12/59 | Wade | 131—10 |
| 3,017,309 | 1/62 | Crawford et al. | 156—185 |
| 3,025,861 | 3/62 | Cobb. | |

OTHER REFERENCES

Modern Plastics (September 1958), as reproduced in the Encyclopedia Issue of Modern Plastics, 36 (1959), pp. 640 and 641.

EARL M. BERGERT, *Primary Examiner.*

CARL F. KRAFFT, ABRAHAM G. STONE, *Examiners.*